INVENTOR.
WALTER H. CHAMBERS

INVENTOR.
WALTER H. CHAMBERS
BY
Emery, Booth, Miller & Townsend
ATTORNEYS

Sept. 3, 1963   W. H. CHAMBERS   3,102,417
PORTABLE TESTER FOR ROCKWELL OR OTHER
PENETRATION HARDNESS METHODS
Filed April 13, 1961   3 Sheets-Sheet 3

INVENTOR.
WALTER H. CHAMBERS
BY
Emery, Booth, Miller & Townsend
ATTORNEYS

United States Patent Office 3,102,417
Patented Sept. 3, 1963

3,102,417
PORTABLE TESTER FOR ROCKWELL OR OTHER PENETRATION HARDNESS METHODS
Walter H. Chambers, Canterbury, N.H.
Filed Apr. 13, 1961, Ser. No. 102,815
5 Claims. (Cl. 73—81)

This invention relates to materials hardness testing, with major application to metals and other materials for which the established numbers and scales of hardness values such as Rockwell, Brinell or other system, are appropriate. More particularly the invention aims to provide a small compact and sturdy hardness tester device or apparatus of overall size and weight making it suitable for convenient manual porting from place to place wherever a hardness test is to be performed, yet of such character as to apply to the test work actual and accurate pressures, fully hydraulically, as established for the Rockwell, Brinell or other indentation-type hardness methods and accordingly to afford readings in the true values of the given method and scale.

Various other attendant objects and advantages will be apparent from the accompanying description and drawings of an exemplary embodiment of the invention and wherein.

Figure 1:
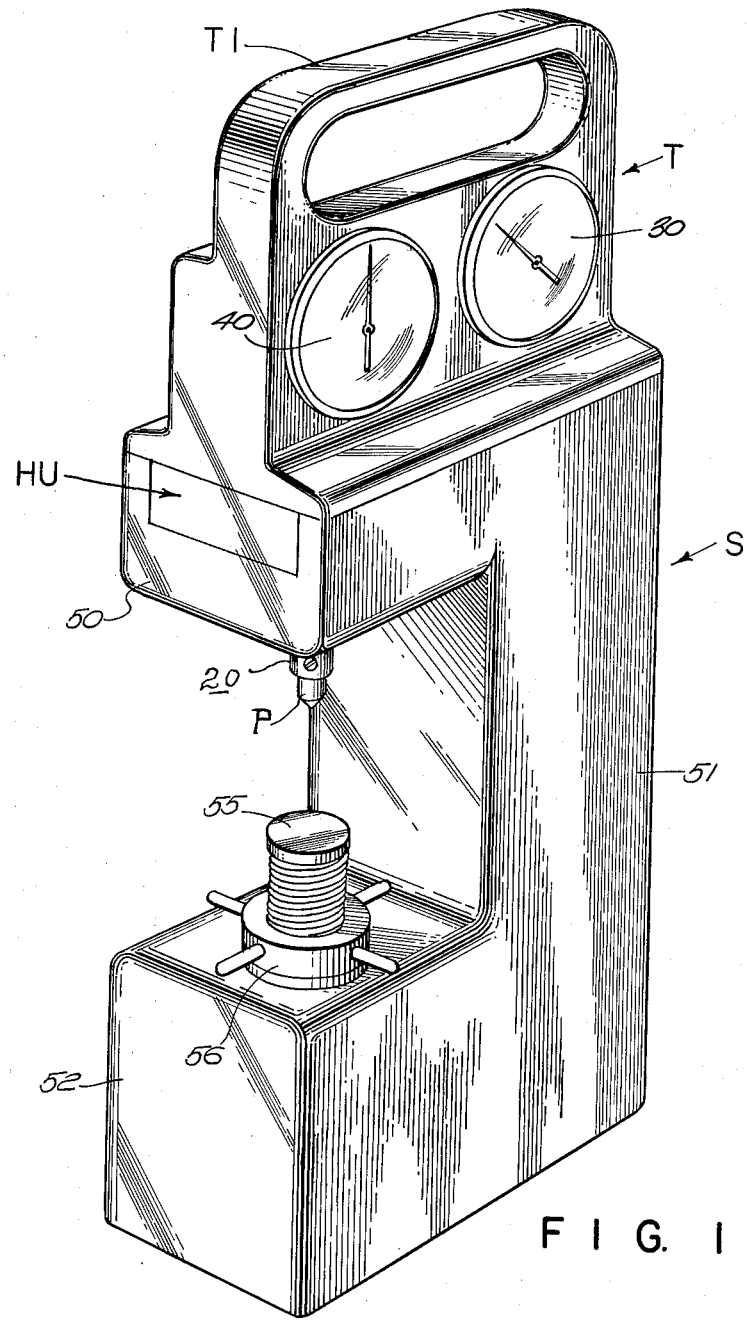
FIG. 1 is a perspective view of a hardness testing instrument unit shown complete and self-contained and including a convenient carrying handle.

Understanding of the present invention and the distinctions thereof over the prior art will be aided by the following introductory explanation.

Mechanical "hardness" as here concerned has been defined broadly as the resistance to penetration or indentation by another body. On that basis the penetration or indentation method, as typified by the Rockwell, the Brinell and some others, has been widely accepted for examining materials with respect to the presence of that function or property called "hardness." In the nature of things such hardness testing method is not an absolute measurement. The variant adhesive and cohesive forces to which the constituent particles in materials are subject, and other inherent variables, militate against a hardness measurement completely independent of arbitrary standards. But by establishing certain shapes and specifications for the indentors or penetrators, certain values for the pressure loads and certain procedural steps, usefully acceptable scales of numerical values for hardness are had, as with the Brinell, the Rockwell and other indentation hardness testers.

For the purposes of the disclosure of the present invention the further explanation will be with reference to the Rockwell hardness method, again noting that the principle of this invention and the apparatus as herein illustrated by way of example are applicable also to the Brinell or other penetration methods.

As stated by the originator S. P. Rockwell as found in the publication Traction, American Society for Steel Treating, August 1922, "The Rockwell hardness number is based on the additional depth to which a test point or ball is driven by a heavy (major) load beyond the depth to which the same penetrator has been driven by a definite light (initial) load."

For the harder materials the Rockwell penetrator is a sphero-conical diamond of a certain selection and formed to a cone of 120° angle and a mechanically lapped spherical point. Such is employed for the Rockwell C scale, for which the standard major load is 150 kg. and the initial load 10 kg. For less hard materials as for example brass, cast iron, and unhardened steels, the penetrator is a specially hardened steel ball $\frac{1}{16}$ inch in diameter held in a steel chuck. This is used with the Rockwell B scale for which the standard major load is 100 kg. and the initial load again 10 kg. The Rockwell system includes various other special scales and loads not necessary to refer to here, it being understood that the present invention is applicable to any of these.

On the direct-reading dial of standard Rockwell hardness testers two concentric series of numbers are calibrated, respectively for the pointed penetrator and the C scale, and the ball penetrator and the B scale, the dial figures for the two scales customarily also distinguished by color, as black and red respectively. Such form of dial is shown herein for the hardness-value indicating dial gauge 40, at the left on FIG. 2.

In making a standard Rockwell test for hardness with the relatively bulky bench-type apparatus heretofore available, the work is stationarily presented opposite the selected point or ball penetrator. Then the 10 kg. minor load is applied, bringing the penetrator into firm engagement with the work and effecting a preliminary or minor indentation. This stage is referred to as the "set point" for the test. The hardness scale and index thereof are now relatively adjusted to read zero. The major load is then applied until the pointer comes to rest. Thereupon the major load is removed but not the minor load. The Rockwell hardness number is then directly readable on the dial. This is a measurement of the difference in depth of the holes or indentations made under the minor and the major loads following any recovery of the material to the minor load status.

Thus the Rockwell method is based not on total indentation depth but on the measurable increment of depth due to the increment of the pressure loading. Under the Rockwell C scale and the conical penetrator, the minor load being 10 kg. and the major load being 150 kg. the increment of load is 140 kg. The increment of indentation depth due to the increment of load is 0.00008 in. for each number of point of hardness of the Rockwell C scale.

From the foregoing explanation it is apparent that for a hardness tester to conform truly to the Rockwell method and value numbers the actual and identical pressure loads, such as the 10 kg. minor and 150 kg. major loads of the Rockwell C scale example, should be applied if correct results are to be obtained. Resort to use of some lesser or fractional loads, with the application of some multiplication factor purporting to afford Rockwell scale numbers has not proved satisfactory.

Under the present invention such actual loads are made possible through full hydraulic operation in the load application yet in a compact unitary device or apparatus of relatively small size and weight such as to be easily hand portable, as herein illustrated and described by way of example.

The problems involved in accomplishing true Rockwell or other standard pressure loadings have heretofore discouraged or defeated production of an acceptably operative compact hand-portable tester, such as accurately to afford readings in true values as above referred to and in such and other respects entirely comparable in resultant hardness measurements to the usual bulky bench-type apparatus having the correspondingly large pistons, chambers and jack or press-type means heretofore employed for applying the substantial pressures involved.

Portable hardness testers have been proposed as in Patents 2,448,645, 2,466,577 and 2,544,205 to W. A. Williams. In these however the pressures are not developed hydraulically and the devices rely on applying loads against a "flexible" element and measuring the displacement or the resistance thereto. Another instance is found in Patent 2,536,632 to Alfred Ernst where movement of a fluid affects a capillary tube adjacent a dial and again lacking anything of the order of actual Rockwell pressures. None of these suggested devices provides a hydraulic testing method in the sense of the present invention or provides for hydraulically developed pressures of the Rockwell or other standard order.

As previously noted, for the purposes of the present disclosure, the apparatus of the invention is illustrated and described by way of example with reference to the Rockwell methods but is applicable also for Brinell or other indentation methods with appropriate proportioning and arrangement of hydraulic parts and modification of the dial gauge graduations.

Referring to the drawings, FIG. 1 shows a portable tester device as a whole. It there comprises an hydraulic operating unit designated generally at HU, a support or mount S and desirably a carrying and top protective portion T.

In accordance with the invention the hydraulic operating unit HU, adapted to receive a pressure gauge 30 and a hardness values dial gauge 40, is constructed and arranged to be in effect a self-contained element, for removable and interchangeable assembly with and upon any appropriate support, holder or mount such as designated at S, again referred to later, along with the optional top cover or carrier portion of the illustrated assembly, such as represented at T by way of example. This latter may be variously designed, desirably with a carrying handle such as represented at T1.

Such hydraulic unit HU, shown separately in FIGS. 2 to 5, comprises a main frame or housing body 1 of shape and size to contain the variable-volume pressure-fluid chambers and hydraulically communicating passages to be described, and being formed preferably of a substantially integral metal block or plate. Conveniently it may have the generally rectangular form such as illustrated, noting FIGS. 2 to 5, one end of said main body 1 being seen also in FIG. 1. It is compactly proportioned and dimensioned for operative installation on a selected holder such as S which may be of the self-supporting type having a general C-form shown, or otherwise. Said unitary plate-like frame or housing block 1 is also adjustable for use by attachment directly to larger work pieces to be tested, as by clamping, should such be more convenient or desirable for any reason.

Figure 2:
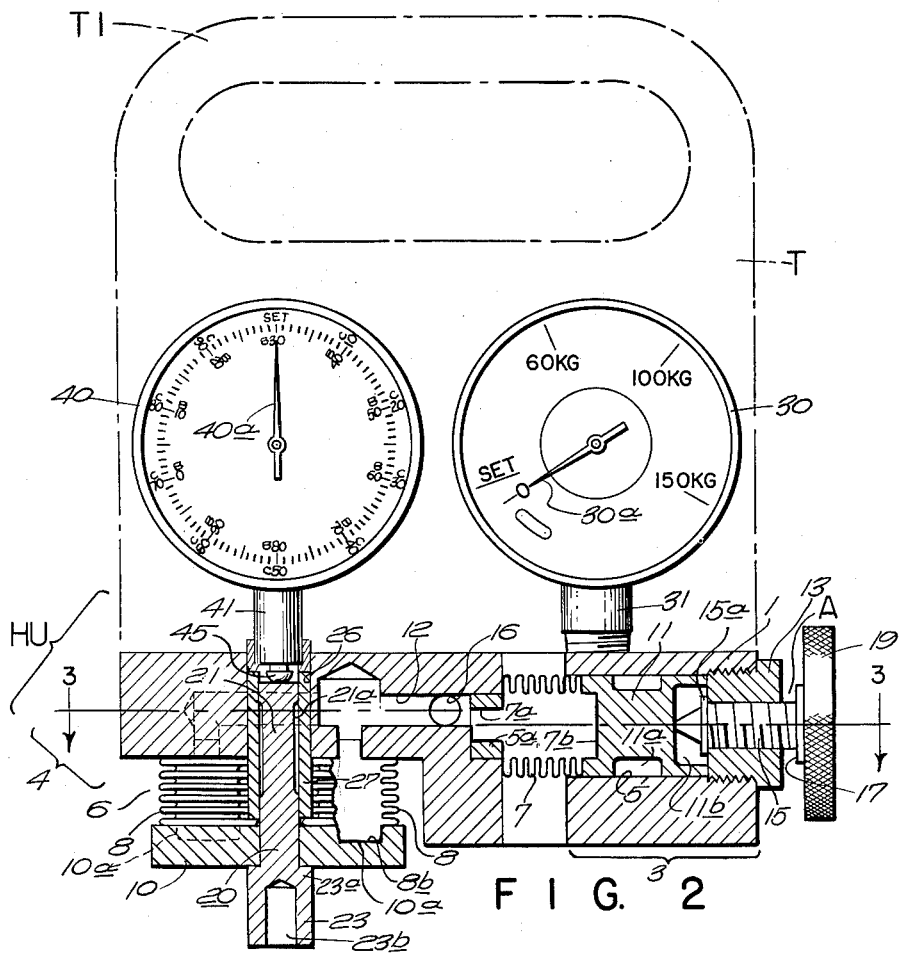
FIG. 2 shows in full line the hydraulic operating unit of the device in vertical longitudinal and substantially central section, as if upon the line 2—2 of FIG. 3, apart from the support and with the optional carrier portion indicated in phantom.
Figure 3:
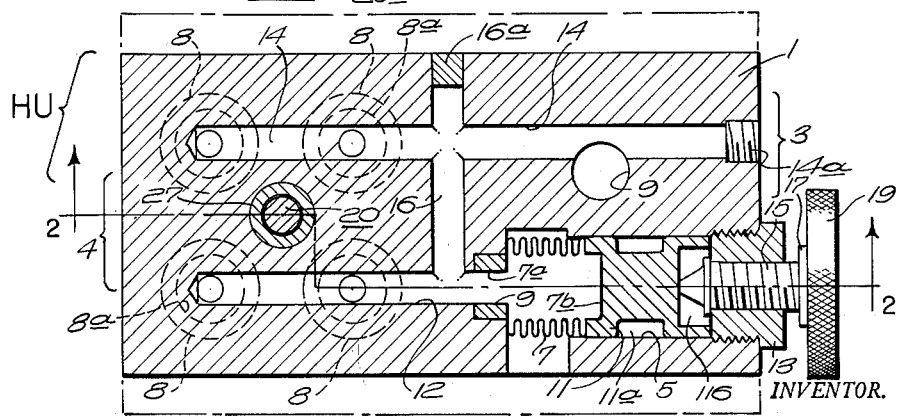
FIG. 3 is a horizontal sectional view of said unit as at the line 3—3 of FIG. 2.

The hydraulic unit body 1 comprises an actuator or pressure input and control section 3, and an output or penetrator operating and measuring section 4, respectively at the right and the left of the housing body 1 as viewed in FIGS. 2 and 3. The pressure gauge 30 is conveniently located at the input section 3, and the hardness values dial gauge 40 at the output section 4.

Said input or control section 3 of the body 1 has provided therein by machining or otherwise an elongate recess 5 extending inward from an outer wall of the plate-like body and adapted operatively to contain an expansible-contractible variable-volume chamber 7 of any known or preferred fluid-tight construction adapted for expansion and contraction elastically in response either to external or to internal pressure variation. In the illustrated example there is shown for the purpose a corrugated metallic bellows 7 of calculated size and volume as appropriate for the range of hydraulic pressures for the given hardness tester. At the inner end said recess 5 is counterbored to receive a collar 5a bonded to the body 1, the adjacent or inner end of the bellows having a port-defining central neck 7a received within and sealingly bonded to said collar 5a, adapting the bellows to receive and seal the hydraulic fluid internally in this example.

Said variable-volume chamber or bellows 7 is closed at the opposite or outer end 7b and is there fitted and bonded to the adjacent end of an actuator shown as a thrust member 11 slidably guided in the recess 5 by the circumferential wall thereof. For friction-reducing purposes consistent with accurate alignment of said member 11 in the guiding recess 5 it may be formed with one or more annular grooves as at 11a, minimizing the area of wall contact. The outer end of the recess 5 is operatively closed by removable wall means as represented by the plug 13 having threaded engagement in the inner body 1. This wall member 13 and the thrust member 11 are relatively proportioned longitudinally and with regard to the axial extent of the bellows 7 so that in the inactive or relaxed status of the hydraulic system this wall member 13 has abutment with the thrust member 11 and serves as a limit stop for the distension or outward movement of the bellows 7.

Manual means is provided for applying pressure to and controlling the pressure upon the thrust member 11 and the variable-volume chamber or elastic bellows 7 associated with it. For this purpose said end wall member 13 is centrally drilled and threaded to receive a correspondingly threaded pressure applicator and controlling screw 15 extending through it. The outer end of the actuator or slidable thrust member 11 in the illustrated example is centrally recessed as at 11b opposite to and adapting it to receive the adjacent end of said pressure controlling screw 15. The inner end of the latter is preferably tapered and rounded for direct and accurately centered abuttive contact with said actuator or thrust member 11 centrally at the bottom or inner wall of the recess 11b thereof. An integral or other circumferential flange or collar 15a fixed on the pressure-adjusting screw 15 near the inner end thereof and within the actuator recess 11b limits outward travel of said screw. The outer end of said adjusting screw 15 has fixed on it a stop collar 17 and beyond it a manipulating fingerpiece or manipulator 19 shown as a knurled knob. Said external collar 17 is dimensioned and located with respect to the length or axial extent of the described parts to serve as an inward limit stop for the compression of the bellows 7 and thereby presenting a maximum limit of pressure to be applied thereto.

It will be understood that in the illustrated example the described parts are dimensioned, proportioned and arranged with respect to the remainder of the hydraulic system to be described, and in keeping with the major pressure loads to be applied for the given hardness testing purposes, so that maximum travel of the pressure control screw 15—19, and corresponding compression-expansion movement for the bellows 7, need not be extensive, usually not more than a minor fraction of an inch for testers having the general compactness in keeping with the invention. In FIGS. 2 and 3 the parts are shown in the normal rest or relaxed and relatively non-compressively contracted or but slightly expanded status of the bellows 7, as at times of no test load upon the penetrator rod 20 and the hydraulic system. The bellows 7, the thrust member 11 and the pressure control means 15 accordingly appear in their outermost positions, to the right on FIGS. 2 and 3. The spacing as indicated by the reference letter A, FIG. 2 between the head of the wall member 13 and the external stop 17 of the screw 15 represents the calculated maximum travel in this example.

Merely for convenience in description the wall of the housing unit or body 1 at which the gauges 30 and 40 are mounted may be referred to herein as the top wall and that opposite to it as the bottom wall of such unit. Likewise the wall of the body 1 at which the pressure screw 15—19 is located, also the remote wall opposite thereto, at the left, FIGS. 2 and 3, are herein at times termed end walls, and the other wall pair herein at right angles thereto and in this instance of greater extent are called longitudinal or side walls. It is to be understood that the tester instrument or assembly as a whole is adapted for use in any desired position with reference to the vertical. Hence any directional expressions such as vertical, horizontal, up, down, etc. have reference only to the position of the tester selected for illustration in the drawings, and impose no structural or operational limitation upon the device as a whole with respect to the actual gravitational vertical.

Figure 4:
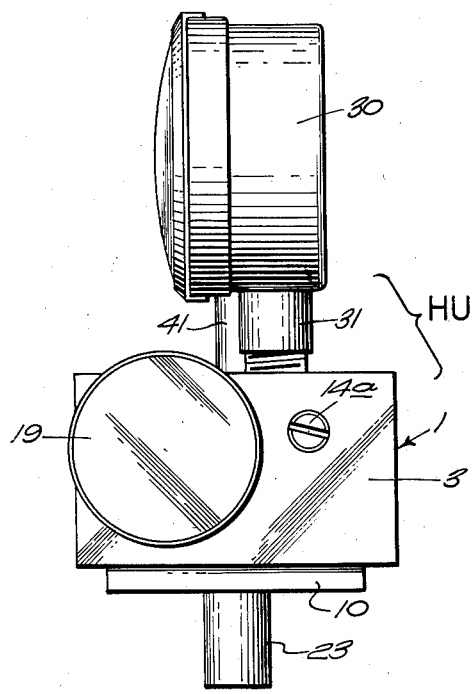
FIG. 4 is an end elevation of the unit as viewed from the right relative to FIG. 2.
Figure 5:
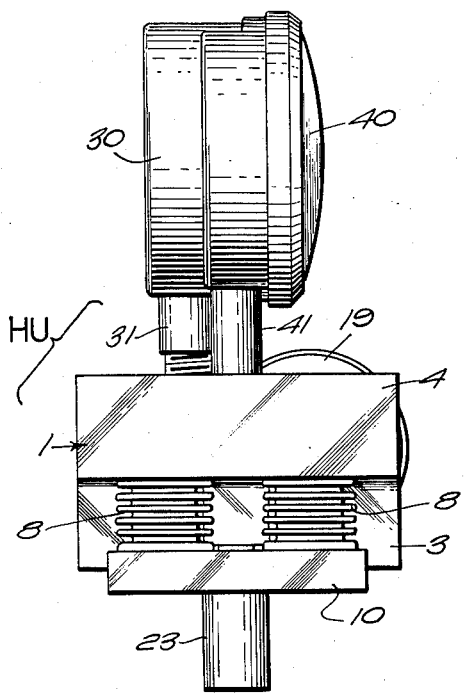
FIG. 5 is an opposite end elevation.

Considering now the other or pressure output and measuring section 4 of the hydraulic unit housing body 1, noting FIG. 2, also FIGS. 4 and 5, said section has an upwardly recessed or reduced-thickness main part providing a downwardly open space 6 for operative reception of a plurality or group of variable-volume chambers or elastic bellows 8, 8, etc. of which four are represented in the present example. A greater or less number thereof may be employed in some instances, each identical to each other structurally and volumetrically. They are shown as corrugated or convolute metallic accordion-like devices of the type of the first variable-chamber element or bellows 7.

These bellows 8, 8 of the output section 4 constitute pressure multiplying or amplifying and transmitting means with respect to the penetrator rod 20 to be described, and being disposed operatively intermediate the latter and the first pressure-fluid chamber or bellows 7. They are symmetrically grouped and disposed about a center at which is located the central output axis of the device, the line along which the test penetrator 20 is to be moved and the penetration depth measurements to be taken and indicated upon the mentioned hardness values dial gauge 40. Said plurality of bellows 8 is commonly connected hydraulically, in series or parallel or series-parallel, to said first or input bellows 7 in a manner to effect an automatic multiplication or leverage factor for the pressure load as applied at the pressure control screw 15—19, said output bellows 8, 8, acting equally and parallelly and the pressure amplification being proportionate to or a factor of the number of said amplifier and output bellows 8.

The axes of the multiple bellows 8, 8, etc. of this output section 4 of the housing body are all parallel with each other and with the defined central output axis, being disposed vertically in the illustrated position. In the particular example shown the operative axes of this bellows group 8 and the common line of pressure thrust are transverse to the body 1 and perpendicular to the operative axis of the first bellows 7, the latter extending longitudinally of the unit body 1, horizontally in the views of the drawings. Within the invention the first bellows 7 and those of the amplifier group 8 may be otherwise disposed as to directional interrelation.

The under face of the horizontal top wall of this output section 4 overlying the bellows-receiving recess 6 has formed in it a plurality of seating recesses to receive the upper port-defining neck 8a of the bellows group 8, these being entered into and sealingly bonded to the walls of said seating recesses. The opposite and herein outer or bottom ends 8b of said bellows 8 are closed and seated on and structurally bonded to a pressure-transmitting foot plate 10, FIGS. 2, 4 and 5. This connecting and supporting plate 10 has at the upper face appropriately located seating recesses 10a for the lower and closed ends of the respective variable-volume chambers or bellows 8. It is of a size receivable at the open lower area of the space 6 of the output section 4 so as to underlie and in effect provide a vertically movable carrier platform for said bellows plurality and for the penetrator rod 20 disposed centrally thereof. This bellows-connected plate 10 is symmetrically formed and is centered coaxially with the mentioned central output axis at the operative center of the bellows group, and is dimensioned to be operatively disposed substantially within the area of the main body or housing unit 1, for ease of installation of the entire hydraulic element HU with respect to the selected holder such as S, FIG. 1, or with respect to larger test-pieces or work to which said instrument comprising the unit 1 may be directly clamped or otherwise applied.

The hydraulic system of the body 1 of the described hydraulic operating unit HU further comprises interconnecting pressure-fluid passage means between the variable-volume chamber comprising the described control or input bellows 7, the pressure gauge 30 and the variable-volume amplifier and output means comprising said multiplier bellows group 8. Such hydraulic fluid connections may be variously formed and arranged. In the interest of compactness, simplicity and economy in manufacture a through straight-line and generally parallel passage arrangement is illustrated, having a single transverse fluid-conduit connection between the herein two main branches serving the plurality of output bellows 8 in a series-parallel disposition.

Accordingly as best seen in FIG. 3 the body 1 is drilled or otherwise formed with a longitudinal passage 12 in longitudinal extension of the recess 5 of the control or applicator section 3 and centrally in line with two of the bellows 8, 8 at the same side of the body 1. Laterally spaced from the passage 12 toward the other side of the body 1 is a second longitudinal passage 14 centrally in line with those bellows 8, 8 which are at said latter body side. Conveniently the passage 14 paralleling the first passage 12 is drilled or otherwise formed from an end wall of the body 1, herein that at which the pressure control screw 15—19 is located. At said end the passage 14 is normally closed and sealed as by a sealing filler plug 14a tapped into the body 1 and installed after the entire confined volume of the described system including all the variable-volume chambers or bellows 7, 8 and the connecting passages have been filled with the selected substantially non-compressible hydraulic fluid.

The passage branches 12 and 14 are cross-connected in the area between the input bellows 7 and the amplifier bellows group 8, herein by the transverse passage 16 at the same level with the longitudinal passages 12, 14, and shown as drilled inwardly from the rear longitudinal or side wall of the body 1 medially thereof and across through the passage 14 and into intersecting communication with the passage 12. The outer end of such interconnecting passage 16 is closed and pressure sealed as by a plug 16a welded or otherwise fixed in the body 1.

In the pressure control or input section 3 of the operative unit HU the body 1 thereof is formed with a mounting seat and fluid-communicating passage for the mentioned pressure gauge 30, herein substantially central longitudinally of the control section 3 of the body 1 and comprising a cylindrical bore 9 at the body top wall threaded to receive the supporting tubular post 31 of said pressure gauge 30. As seen in FIG. 3, said gauge-seating bore 9 is extended downwardly into intersecting communication with the passage 14 of the hydraulic system.

As previously stated, the described hydraulic system, comprising the input or control bellows 7, the plurality of multiplier output bellows 8, 8, etc., the described connecting passages 12, 14, 16 and the conduit connection at 9, 31 to the conventional diaphragm, plunger or like actuator of the pressure gauge 30, is entirely filled with a suitable hydraulic fluid such as an oil or other non-compressible liquid of selected viscosity under average expected temperature conditions. It will be understood that upon full filling of the system as at the filler plug 14a and sealing installation of the latter the system in its entirety is hydraulically pressure-tight sealed "permanently" in the sense of operative availability over long extended use periods.

In this connection it will be further understood that in the filling and sealing of the hydraulic system the fluid is so supplied and in such filling volume and the sealing is so effected with reference to the inherent elasticity of the bellows elements that in the normal or rest condition of the unit, as between testing operations, such as in FIGS. 2 and 3, with the pressure-regulating screw 15—19 fully backed out, said variable-volume elements or bellows 7 and 8 are substantially relaxed or under a minimal internal pressure. At such time the pressure plate 10 and the thereto connected penetrator rod 20 to be described are elevated substantially as in FIG. 2, and the pressure-imparting thrust member 11 is in the outermost position, toward the right on FIGS. 2 and 3, in abuttive contact with the backed off control screw 15—19 as indicated.

The hydraulic operating unit HU further comprises means for holding and operatively presenting the penetrating or indenting tool or instrumentality proper, generally a selected point or ball penetrator such as the point P of FIG. 1, through the medium of which the penetration value is obtained in terms of a particular hardness scale, such as the Rockwell B and C scales in the illustrated example; see FIG. 2.

Such means herein comprises the mentioned penetrator carrier or rod designated generally by the numeral 20. It is disposed at the described common output axis at the geometrical center of the bellows group 8, being integrally or otherwise centrally fixed on and carried with the described bellows-seating pressure-amplifying plate 10 with its axis normal thereto.

In the illustrated example such penetrator rod 20 comprises a cylindrical upper and intermediate portion 21 fitted through a conformant aperture therefor formed centrally in the plate 10, and below the latter a depending lower end or socket portion 23 of larger diameter such as to provide a shoulder 23a having abuttive contact with the underface of the plate 10. As stated, the latter and the penetrator rod 20 are rigidly secured together as an operative unit.

Said penetrator rod 20 along with the plate 10 is operatively guided in the output section 4 of the body 1 of the hydraulic unit HU. For this purpose said body section 4 has a central bore 26 coaxial with the operative central axis of the bellows group 8. Within said bore 26 there is stationarily securely fixed as by drive fitting and welding a sleeve 27, of a length to extend from near the top of the bore, FIG. 2, and downwardly into the space 6, centrally of the bellows group 8 therein. The depending lower end of said sleeve 27 terminated somewhat above the upper face of the pressure plate 10, in the normal or relaxed position of the parts as previously described, to serve as a limit stop against excessive upward movement of the penetrator rod 20 and pressure plate 10 or over-compression of the bellows 8. This sleeve 27 fixed on the body section 4 provides accurate low-friction guidance for the penetrator rod 20, the portion of the latter received within the guide sleeve 27 desirably having one or more annular grooves as at 21a reducing the area of sliding contact of the penetrator rod 20 with the inner wall of the fixed guide sleeve 27.

The test-piece penetrator proper, such as the point type P, FIG. 1, is adapted to be interchangeably installed and secured in the socket 23b of the penetrator rod 20 in accurate axial alignment with the axis thereof and with the central operative axis of the bellows group 8.

At the upper end of the penetrator rod receiving bore 26 the unit body section 4 is provided with mounting means for the hardness-numbered dial gauge 40. As illustrated, noting FIG. 2, the latter has a tubular supporting post 41 with the lower end firmly fitted and fixed at the upper end of the bore 26. Such gauge 40 may be of any known or preferred construction wherein an index or pointer such as 40a movable over the dial is adapted to indicate extremely small increments of movement of a feeler or contact element such as that indicated at 45 on FIG. 2 at the bottom of a plunger or column operatively extending up through the post 41 and into measurement transmitting connection with the internal mechanism of the gauge, such for example as in the Ames Patent 1,945,796. The installation of the dial gauge 40 on the body 1 of the hydraulic operating unit HU is such that under the spring or other loading provided within the gauge the contact-element 45 stands in operative thrusting engagement at all times with the upper end of the penetrator rod 20.

In the illustrated example the dial of the gauge 40 is circumferentially graduated with two sets of hardness numbers respectively for the "regular" or Rockwell C scale shown at the outer position, and for the Rockwell B scale as shown at the inner position. The dial includes appropriate marking of the "set" or zero points for the respective scales, it being understood that the dials are of the movable type for adjusting purposes and as appropriate for the Rockwell hardness methods. Thus they have capacity for temperature adjustment for "zeroing" the instrument to correct for any effect upon the hydraulic system due to ambient temperature at the particular location of use.

As earlier explained, the operating unit HU comprising the hydraulic system with the penetrator or indenter rod, the gauges and the pressure setting and control means, is adapted for removable installation upon and for use with any preferred holder and work or test-piece-presenting means, that illustrated at S in FIG. 1 being exemplary. As there shown such holder comprises a rigid frame or block of general C-shape comprising a head 50 having a horizontally recessed seat for the body 1 of the operating unit HU and in which the latter is secured, preferably demountably as by a series of anchor screws, not shown. Such head 50 is rigidly supported on a column portion 51 having a base 52 one lateral portion of which is disposed in opposite vertically opposite spaced relation to the laterally projecting portion or arm of the head 50 through which the penetrator rod or indenter point P operatively extends. Centrally in line with the point P the base 52 is provided with an anvil 55 on a threaded post vertically adjustably held in the base of the holder S, the latter having a manually operable elevator nut 56 turning of which effects raising or lowering of the anvil and work or test piece thereon relative to the penetrator point P.

The operation of the disclosed apparatus in the performance of a hardness testing operation is as follows: Assume that the hydraulic unit HU is fixedly positioned as by installation upon a supporting device such as S of FIG. 1. The pressure adjusting screw 15—19 is backed out, toward the right on FIGS. 2 and 3, until stopped. The movable dial of the pressure gauge 30 is adjusted as appropriate to correct for the particular ambient temperature conditions, to bring the zero of the dial opposite the pointer 30a.

The elevator screw 56 for the test-piece platen or anvil 55 of the support S may be given a preparatory coarse adjustment for bringing the spacing between the platen 55 and the penetrator point P approximately to the thickness of the test piece. Such test piece or material to be tested is then placed on the platen 55 and the nut 56 is turned in the elevating direction, bringing the test piece into contact with the penetrator P. Turning of the elevating nut 56 is continued until the pointer 30a of the pressure gauge 30 reads "Set." This means that the so-called "minor load" as for a Rockwell test has been applied, understood to be 10 kg. in the illustrated example.

In this minor load setting procedure it is evident that the test piece is forced upward with the platen 55, applying pressure upon the penetrator P, the pressure plate 10 and the bellows group 8 and through the hydraulic system to the control bellows 7, the latter stopped in outermost position of the thrust member 11, and to the pressure gauge 30, the pointer 30a of which accordingly is moved to show the minor load (10 kg.) thus applied.

Thereupon the movable dial of the hardness values gauge 40 is manually shifted to bring the point thereof marked "Set" or zero opposite the gauge hand 40a. Here it may be noted that the scales of this pressure values gauge 40 are reversed scales, so as to read directly in the hardness values, it being understood that the lesser the penetration the greater is the hardness number; or conversely, the greater the penetrator travel, the softer is the material and the Rockwell value numbers hence are smaller.

Both gauges having thus been set to the applied minor load status, the pressure imparting and controlling screw 15—19 is turned to move it inwardly, toward the left on FIGS. 2 and 3 and so increasing the pressure of the hydraulic system until the pointer 30a of the pressure gauge 30 reaches the selected point, such as 60 kg., 100 kg. or 150 kg., according to the test scale being used and the major load to be applied for such scale. This accomplishes the application of the so-called major load for the particular test.

Thereafter the pressure control screw 15—19 is again backed off, reducing the pressure until it returns to but not below the minor load status, i.e. until the pressure gauge pointer 30a again reads "Set." This permits the material of the test piece to effect whatever elastic recovery, if any, for which it may have inherent capacity. Then the actual hardness value or number is readable directly upon the dial of the hardness values gauge 40, either on the outer or C scale or the inner or B scale of the illustrated example, according to which one is being used in the particular test. Such reading in the manner above explained is seen to be based on the depth of indentation of the test piece less any elastic recovery following removal of the major load and less any penetration initially resulting from the minor load.

This completes one hardness determination. The elevator nut 56 of the support S may be reversely turned in the platen lowering direction, releasing the test piece from the penetrator and for removal from the platen. The instrument is then in readiness for use for the next test.

From the foregoing description in connection with the drawings the numerous advantages afforded by the means of the invention will be apparent to those of ordinary skill in the art of hardness testing. The hydraulic unit HU is capable of use with different hardness-values scales and methods including the various Rockwell scales and others of the penetration or indentation type. Obviously included is the so-called regular and probably most frequently used "Rockwell C" scale, having major loads of the order of the 60 kg., 100 kg., 150 kg. as illustrated, and minor load of 10 kg., and for which the thickness of the test piece should be at least about 0.027 in. The device of the invention however is equally useful in the manner of the so-called Rockwell "superficial" hardness tester or scale, for instances where but shallow penetration is possible, as when the test piece is very thin and where the minor load may be in the range of say 3 to 5 kg. and the major loads of the order of but 10, 15 and 30 kg., the penetrator having increased sensitivity in such lower pressure ranges.

The hardness values dial gauge 40 has the feeler or contact element 45 thereof in direct and exact contact with the center of the adjacent end of the penetrator rod 20, at the longitudinal axis thereof. Hence it is unaffected by any incidental side play of the penetrator rod, making for extreme accuracy and repeatability for the test readings. At the same time friction effects are reduced to a minimum, the instrument being free of levers and attendant fulcra, pivot points and the like, and has a minimum of moving parts, while those employed are structurally simple and manufacturable at low cost for machining and other processing. The hydraulic fluid of the system offers little or no friction since it has no velocity of movement in the completely filled and permanently sealed hydraulic system. Practically the only area of friction presence is at the inner wall of the penetrator rod bushing or guide sleeve 27, this being reduced by the mentioned grooving 21a of the penetrator rod and being further alleviated by reason of the penetrator-rod balancing effect of the group of elastic bellows 8 symmetrically distributed laterally about said rod and geometrically centered with respect to the operative axis thereof.

In the manufacture of the disclosed instrument the permissible pressure and movement readings for the illustrated variable-volume chambers or elastic bellows such as 7 and 8 are selected to be well above the actual pressures and movements required in the expected test performances. Of critical and outstanding importance in this connection is the described principle of dividing and distributing the full pressures required upon the pressure plate 10 and the penetrator rod 20 between the plurality of four or other number of such chambers or bellows operating upon the pressure plate and through it upon the penetrator, thereby not only correspondingly cutting down the necessary input pressure at the control means 15—19 but also extending the operational life for the bellows. At the same time these elements are positively limited as by the described means against accidental excessive movement, as by the out-limiting abutment of the thrust member 11 with the fixed wall 13, the in-limiting abutment of the adjuster stop 17 against the outer face of the wall member 13, and the up-limiting abuttive engagement between the pressure plate 10 and the lower end of the penetrator rod guide bushing 27. As already noted the bellows may be either of the internal or the external pressure types within the sealed hydraulic system such as disclosed.

Attendantly and resultantly the hardness tester apparatus of the disclosed invention and particularly the demountable and separately available unitary hydraulic instrument HU thereof is extremely compact, relatively small in size and light in weight, whereby it is readily manually portable from point to point and for use in the field wherever hardness testing may be required to be performed, again noting that the instrument can be utilized in any position thereof; also that correction or compensation for temperature changes is available in the instrument by reason of the described adjustable dial for the pressure gauge 30.

For the foregoing reasons the full major load e.g. 150 kg. for the penetrator with respect to the test piece can be obtained with very little effort upon the part of the operator, due to the great hydraulic leverage or mechanical advantage. Such hydraulic advantage and consequent small effort required for manipulation of the pressure adjusting means or screw 15—19 makes it easy to control the pressure gauge readings with extreme accuracy. These and other advantages will be apparent from the foregoing description in connection with the drawings and in actual use of the instrument of the invention as herein exemplified.

My invention is not limited to the particular embodiment thereof illustrated and described herein, and I set forth its scope in my following claims.

I claim:

1. A hardness testing instrument adapted for direct reading in standard hardness value scales, comprising a rigid plate-like housing body to be positioned in fixed relation to a test piece, said body having a pressure input and control section and a pressure output and hardness-value measuring section, the input section including a first variable-volume chamber and adjustable screw means for applying pressure thereto, the output section mounting an axially movable penetrator rod with an exposed end for carrying a penetrator member and an opposite hardness values dial operating end, a plurality of similar variable-volume chambers arranged about the axis of the penetrator rod and each having one end fixedly secured to said rod for transmitting axis-paralleling pressure thereto and each having an opposite end anchored in and to said output section of the housing body, pressure-fluid passages connecting in a closed hydraulic system the first chamber and said plurality of chambers in a manner to impart to each of the latter the pressure applied to the first chamber by the screw means and to transmit through said chamber plurality to the penetrator rod a total pressure thrust amplified in proportion to the number of said transmitting chambers, pressure gauging means in communication with said hydraulic system for indicating the pressure status as applied by the screw means, and hardness values dial means having an operating contactor continuously engaged with said operating end of the penetrator rod for indicating hardness values against a scale thereof corresponding to increments of net residual testpiece indenting movement of the penetrator rod relative to a set point.

2. For a portable hardness tester, an hydraulic operating unit comprising a rigid block-form housing body for mounting adjacent a test piece, said body having a pressure input and control section and a pressure output and gauging section, an elongate recess in said input section, a first elastic bellows disposed in and with its axis concentric with said recess and having the inner end fixed to the housing body, a plurality of like elastic bellows in said output section and symmetrically grouped in parallelism about a central output axis, closed passage means in the body hydraulically communicating between the first elastic bellows and each of said plurality of output-section bellows in a sealed hydraulic operating system, an actuator slidably guided in said input-section recess and engaged at the inner end with the outer and closed end of said first bellows, wall means on the body outwardly blocking said input-section recess, a pressure controlling screw rotatively carried in and extending through said wall means for operative engagement with the outer end of said actuator and having a manipulator external to said wall means, each of said group of elastic bellows being bonded at one end to the housing body and each communicating hydraulically at said ends with said passage means, a movable pressure plate having the opposite and closed ends of said grouped bellows plurality bonded thereto in symmetrical array and having fixed thereon and normal thereto a penetrator rod concentric with the axis of symmetry of said bellows group, the housing body having a through opening with low-friction guide means therein for said penetrator rod, said rod extending through the pressure plate and adapted to present a penetrator for engaging a test piece opposite it, mounting means on the housing body for a hardness numbers dial gauge to have operative engagement with the end of the penetrator rod opposite to such penetrator, and other mounting means on the body and in hydraulic communication with said hydraulic system for presenting a pressure-load indicating gauge for observation in conjunction with movement of said manipulator of the pressure-controlling screw.

3. A hand-portable hardness testing device comprising a housing body having a penetrator rod mounted for axial movement therein, said rod having a projecting end adapted to present a penetrator to a test piece to be fixed in opposition to it, said housing body having thereon pressure-input variable-volume fluid chamber means with a movable wall area for reception of a controllable pressure input load, manually incrementally movable means on said housing body for imposing such controllable pressure input load, pressure-output variable-volume fluid chamber means on said housing body comprising stationary and movable end wall areas in operative opposition to each other and mechanically secured respectively to said housing body adjacent the projecting end of the penetrator rod and to said penetrator rod in a manner to transmit axis-paralleling pressure to and to travel with said penetrator rod, said movable end wall area of said pressure-output chamber means having a total pressure-transmitting areal extent determinately greater than that of said pressure-input chamber means for effecting a predetermined amplification as to the output pressure, fluid passages in said housing body establishing fluid-pressure communication between said pressure-input chamber means and said pressure-output chamber means in a pressure-fluid-filled sealed system, a pressure gauge on the housing operatively subject to the fluid pressure of said system, said fluid chambers and passages of said system constructed and arranged to impart actual full pressure requirements to the penetrator load as established for recognized indentation-type hardness scales and said pressure gauge being calibrated correspondingly to read in hardness-scale-setting pressures, and a hardness values gauge on the housing body and having an operating contactor in continuous engagement with the penetrator rod and operable by it for indicating readings directly in units of the selected penetration-type hardness scale.

4. A portable hardness testing device according to claim 3 wherein the penetrator rod carries in radially extending centered relation thereto a pressure plate, and the pressure-output variable-volume fluid chamber means is operatively disposed between said plate and an opposed fixed part of the housing body, said chamber means being closed and secured to the plate at the end adjacent thereto and being anchored at the opposite end to the housing body in hydraulic communication with said fluid passages therein.

5. A hardness testing device according to claim 3 and including in combination therewith a support whereon said housing body is removably mounted, said support having a head recessed to seat said housing body, a base and columnar means connecting the head and base in test-piece-receiving spaced relation with a penetrator tool to be operatively presented downwardly into such space by the penetrator rod, and a vertically adjustable platen and threaded operating means therefor on the base.

References Cited in the file of this patent
UNITED STATES PATENTS

| | | |
|---|---|---|
| 2,054,197 | Gogan | Sept. 15, 1936 |
| 2,203,129 | Campbell et al. | June 4, 1940 |
| 2,839,917 | Webster | June 24, 1958 |